United States Patent [19]

Fleishman

[11] Patent Number: 5,725,270
[45] Date of Patent: Mar. 10, 1998

[54] FLAT SHEET VEHICLE BODY

[76] Inventor: Gregg R. Fleishman, 6071 Hargis St., Los Angeles, Calif. 90034

[21] Appl. No.: 308,150

[22] Filed: Sep. 19, 1994

[51] Int. Cl.$^6$ ........................................ B60R 27/00
[52] U.S. Cl. ................. 296/185; 296/205; 296/180.1; 296/191; 296/203; 280/756; 180/903
[58] Field of Search .......................... 296/205, 185, 296/180.1, 191, 203; D12/85, 86, 90, 159; 280/756; 135/115, 119, 95, 901, 950, 19.5, 33.2; 114/361, 352, 354; 144/381; 180/903

[56] References Cited

U.S. PATENT DOCUMENTS

| | | | |
|---|---|---|---|
| D. 94,847 | 3/1935 | Martin | D12/85 |
| D. 273,577 | 4/1984 | Fleishman | D12/85 |
| 370,732 | 9/1887 | Durkee | 144/381 X |
| 1,136,605 | 4/1915 | Lobato | 296/185 X |
| 2,068,715 | 1/1937 | Stevens | 296/185 |
| 2,359,426 | 10/1944 | Koenig-Fachsenfeld | 296/185 X |
| 2,612,964 | 10/1952 | Hobbs | 296/203 X |
| 3,539,030 | 11/1970 | Gerin | 296/185 X |
| 3,869,166 | 3/1975 | Burst et al. | 296/180.1 X |
| 4,202,579 | 5/1980 | Berggren | 280/756 X |
| 4,553,783 | 11/1985 | Lagana | 280/756 X |
| 4,640,527 | 2/1987 | Taylor | 280/756 X |
| 4,951,994 | 8/1990 | Miwa | 296/180.1 |
| 4,973,082 | 11/1990 | Kincheloe | 280/756 |

FOREIGN PATENT DOCUMENTS

| | | | |
|---|---|---|---|
| 380798 | 9/1923 | Germany | 296/185 |
| 61-253265 | 11/1986 | Japan | 296/180.1 |
| 135907 | 12/1919 | United Kingdom | 296/185 |
| 316917 | 8/1929 | United Kingdom | 296/205 |
| 443903 | 3/1936 | United Kingdom | 296/180.1 |

*Primary Examiner*—Gary C. Hoge
*Attorney, Agent, or Firm*—Lyon & Lyon LLP

[57] ABSTRACT

A teardrop shaped vehicle body which elevates from front to rear thereby providing a safe and aerodynamic shape on which two front wheels and a single rear wheel are rotatably mounted. The vehicle body includes a frame over which flat sheets are bent without substantial plastic deformation and attached thereto to form a skin. The skin contains a transparent portion allowing a driver to view the surrounding terrain, and portions of the skin are detachable from the frame to allow access to the inside of the vehicle body.

3 Claims, 7 Drawing Sheets

FLAT SHEET VEHICLE BODY

BACKGROUND OF THE INVENTION

The field of the present invention is vehicle body designs and the methods of construction therefor.

Under the present federal and state regulatory regime which increasingly requires the use of vehicles driven by less polluting and less powerful alternative fuels or electricity, a need has arisen for smaller, more lightweight, and aerodynamic vehicle body designs. Historically the industry has used the teardrop shape whenever possible, and it is still the aerodynamic shape of choice. However, the teardrop shape has been expensive to construct and maintain making it infeasible for most applications, thus creating a market need for less expensive teardrop shaped vehicle body designs. Industry's current methods of obtaining the teardrop shape are by the plastic deformation of precut sheets or the casting of sheets to the necessary shape and dimensions. Both the casting and plastic deformation process require large machinery and are admittedly expensive processes. Further, the large expense associated with the above initial fabrication processes carries over into maintaining the aerodynamic shape. If a vehicle body is damaged, the same processes must be used to construct replacement sheets for the vehicle body. For this reason, the industry has segmented the vehicle bodies to allow for the localized replacement of sheets instead of an entire vehicle body.

The cost and size of the machinery necessary for the casting and plastic deformation processes also prohibit the manufacture of the individual body sheets by entities other than large industries. Therefore, production of such body sheets is infeasible for small United States companies, entities without sufficient capital for the purchase of expensive machinery, and for business in non-industrialized countries.

SUMMARY OF THE INVENTION

The present invention is directed to a vehicle body providing an aerodynamic shape. To this end, a teardrop shaped floor plan is used for the vehicle body, and the top of the vehicle body increases in height toward the rear of the vehicle. The vehicle body may maintain the teardrop shaped cross section throughout its entire height or through only a portion of its height.

The vehicle body is comprised of a frame and skin. The skin is made from a flat sheet which is, without substantially plastic deformation, bent over and conformed to the frame. The skin has a transparent portion allowing a vehicle driver to view the surrounding terrain. Further, the vehicle body provides a means for entry inside the vehicle body through the skin. The skin can be comprised of a plurality of flat sheets each covering a different portion of the frame.

The vehicle body is manufactured by fabricating a frame, cutting a plurality of flat sheets, bending the flat sheets over the frame, and connecting the sheets to the frame thereby forming the skin.

Accordingly, it is an object of the present invention to provide an improved aerodynamic vehicle body and method of construction therefor. Other and further objects and advantages of this invention will appear from the following description of preferred embodiments and the accompanying drawings in which similar reference characters denote similar elements throughout the several views.

DETAILED DESCRIPTION OF THE PREFERRED EMBODIMENTS

Figures 1, 2, 3:
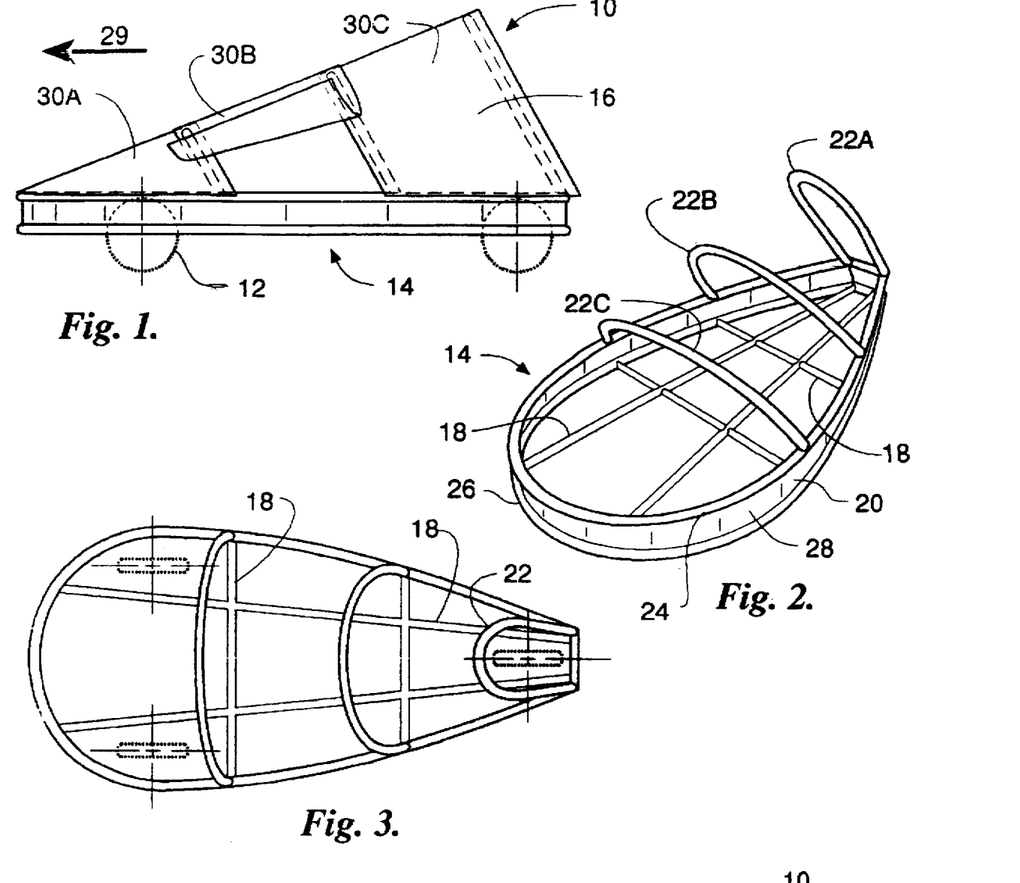
FIG. 1 is a side view of the vehicle body with the skin attached to the vehicle frame illustrating entry to the vehicle body by lifting one of the bent flat sheets from the frame.
FIG. 2 is a perspective view of the vehicle body frame for the vehicle body shown in FIG. 1.
FIG. 3 is a top view of the vehicle body frame shown in FIG. 2.

Turning in detail to the drawings, FIG. 1 shows a preferred embodiment of a vehicle body, shown generally as 10, including three wheels 12 and a frame, shown generally as 14. The vehicle skin 16 is attached to the frame 14, and the wheels 12 are rotatably mounted to the frame 14.

Figure 4:
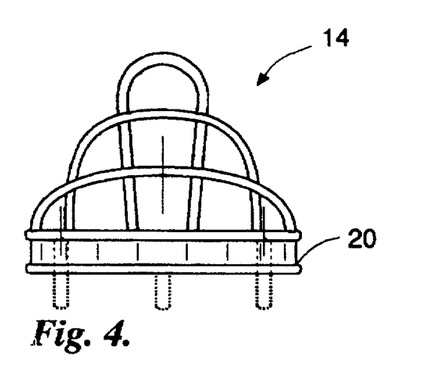
FIG. 4 is a front view of the vehicle body frame shown in FIG. 2.

FIGS. 2 through 4 show a preferred embodiment of the frame 14. The frame 14 consists of four cross members 18, a bottom skirt 20, and three roll bars 22A, 22B, and 22C. The portion of the frame 14 to which the bottom skirt 20 is attached is fabricated into the desired horizontal cross section of a teardrop shape. The pure teardrop shaped floor plan has a circular front and gradually curving sides narrowing to a point, but any of the variations discussed below may be used. Thus, the horizontal cross section provides the floor plan for the actual teardrop shaped vehicle body 10. The depth of bottom skirt can vary, but should provide sufficient room for functional requirements such as power storage, steering mechanism and the lower cockpit space. The bottom skirt 20 is fabricated with an upper tube 24, lower tube 26, and connecting sheet 28. The connections between the frame members may be completed with welds, nuts and bolts, or any other conventional means. The frame can be constructed from aluminum tubing, steel, wood, or some combination of these and other materials.

The cross members 18 which support the cockpit space are connected to the lower tube 26 thereby preventing deformation of the bottom skirt's 20 teardrop shaped horizontal cross section. The cross members 18 also prevent the deformation of the teardrop shape in a collision, and further, the cross members 18 reduce the chance of injury to any occupants of the vehicle body by preventing the collapse of the frame 14 during a collision. The roll bars 22A, 22B, and 22C are attached to the upper tube 24 at an angle. The high roll bar 22A is attached to the rear of the frame 14. The middle roll bar 22B is attached rearwardly of the center of the frame 14, and the front roll bar 22C is attached just forward of the middle of the frame 14. Thus, the three roll bars 22 form a safety cage above the rear of the frame 14 in which a driver or passenger within the vehicle body is contained. Because the high roll bar 22A is located in rear, the vehicle elevates from front to rear. Thus, as the vehicle body travels in the forward direction shown by arrow 29 in FIG. 1, the low front portion of the vehicle body leads and provides a more aerodynamic shape. The bottom skirt 20 acts as a bumper, thus providing an additional reduction to the chance of injury in a collision. The bottom skirt 20 may be flat as shown in FIG. 2, concave relative to the frame 14 as in an air scoop or dam 29A shown in FIG. 18, or convex relative to the frame 14 as in a foam bumper 29B shown in FIG. 19.

Figures 6, 7:
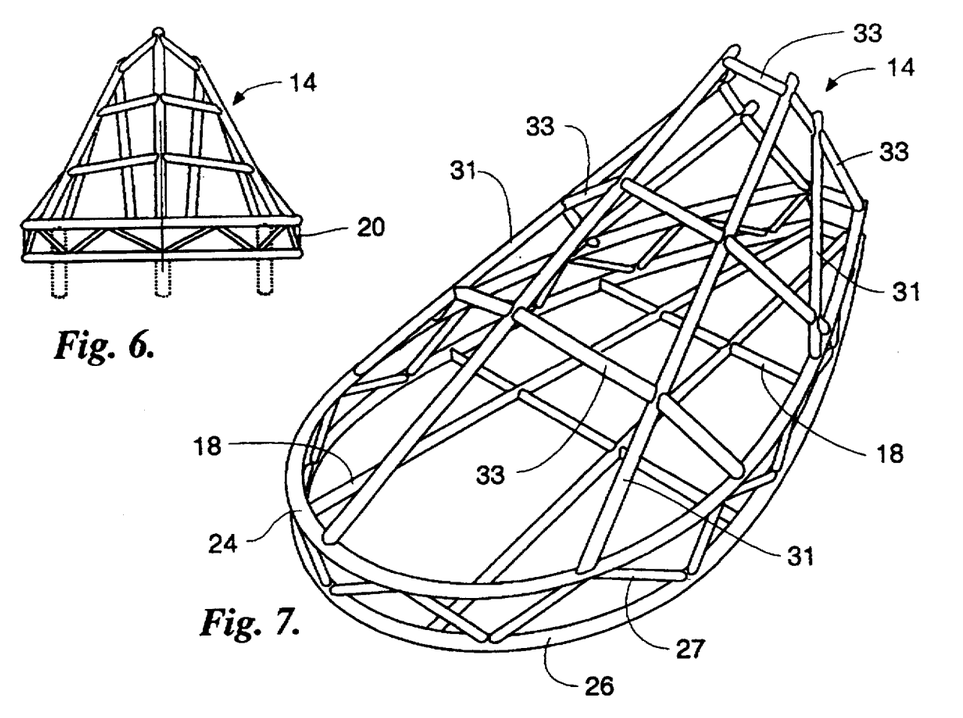
FIG. 6 is a front view of an alternate embodiment of the frame.
FIG. 7 is a perspective view of an alternate embodiment of the frame.

An alternate embodiment of the frame 14 is shown in FIGS. 6 and 7. The lower portion of this embodiment of the frame 14 is the same as the above embodiment wherein the bottom skirt 20 is fabricated with upper tube 24 and lower tube 26, but the connecting sheet 28 has been replaced with diagonal members 27. The top portion of this embodiment of the frame 14 is constructed from straight members 33 instead of the curved roll bars 22. This makes the frame even easier and less expensive to fabricate because a bending step is eliminated.

Figure 5:
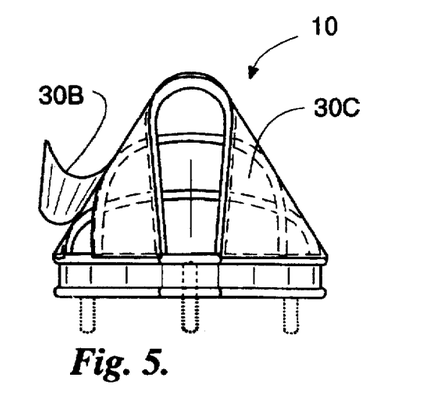
FIG. 5 is a rear view of the vehicle body shown in FIG. 1.
Figure 8:
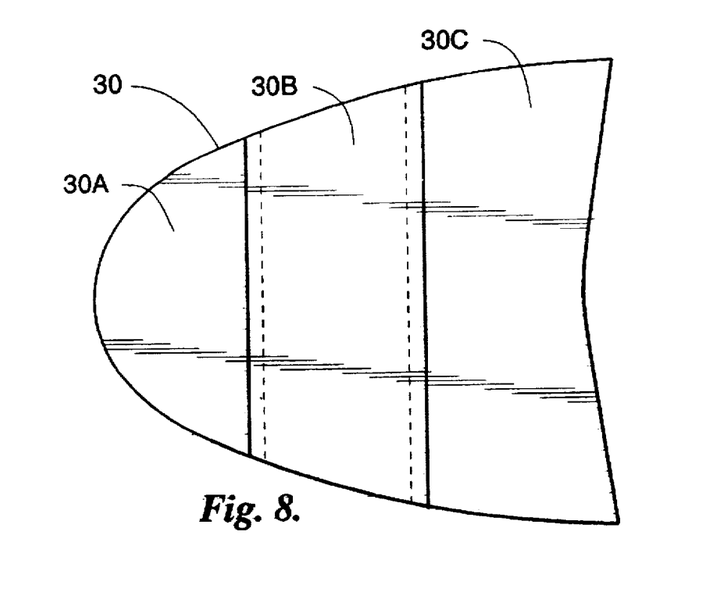
FIG. 8 is a plan view of the flat sheets before they are bent over the vehicle frame to form the vehicle skin.
Figure 9:
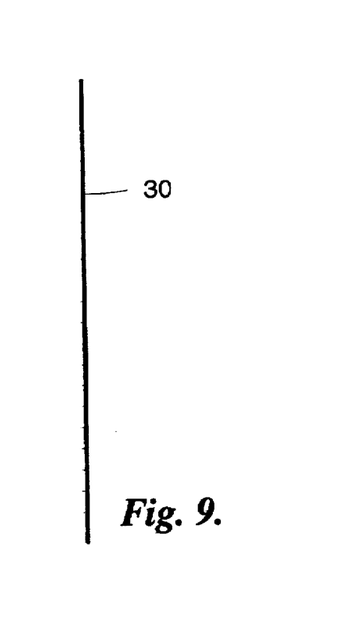
FIG. 9 is an end view of the sheets shown in FIG. 8 before they are bent over the vehicle frame to form the skin.
Figure 12:
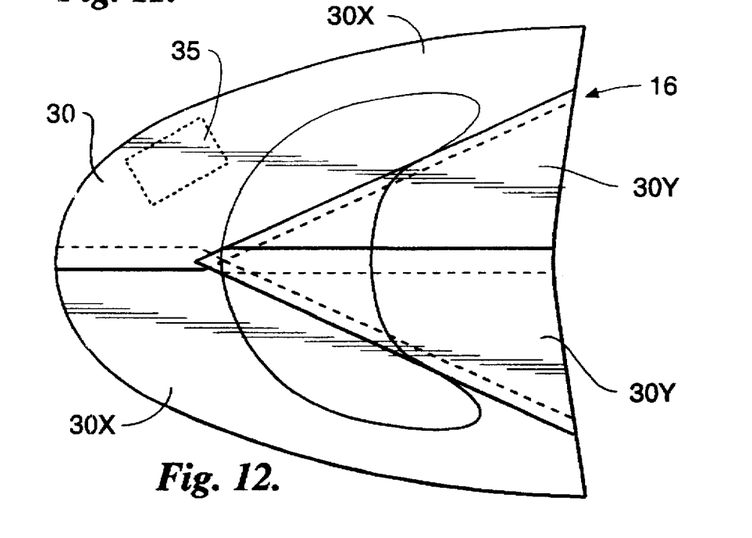
FIG. 12 is a plan view showing an alternate embodiment of skin representation.
Figure 13:
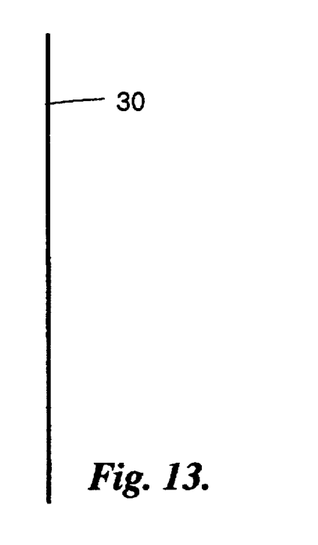
FIG. 13 is an end view of the sheets shown in FIG. 12 before they are bent over the vehicle frame to form the skin.
Figure 14:
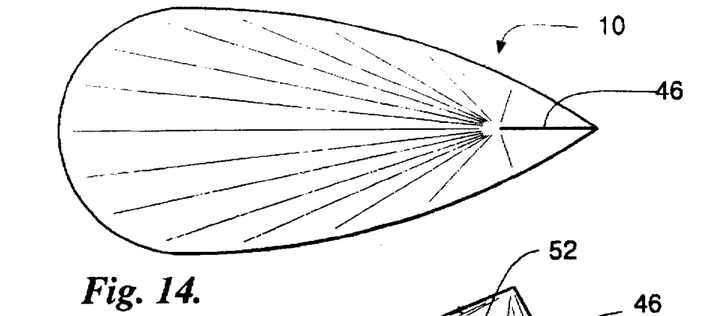
FIG. 14 is the top view of a teardrop shaped vehicle body having a rearward portion which is an edge.
Figure 15:
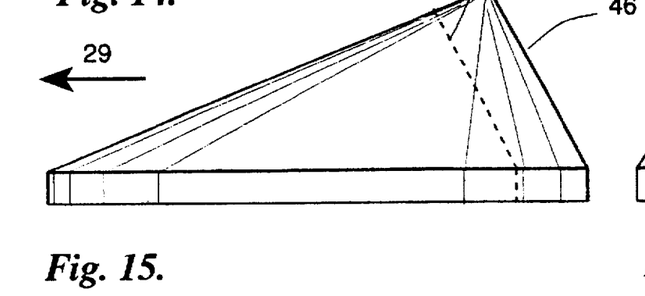
FIG. 15 is a side view of the vehicle body shown in FIG. 14 illustrating that the vehicle body elevates from front to rear in the opposite direction of forward travel.
Figure 16:
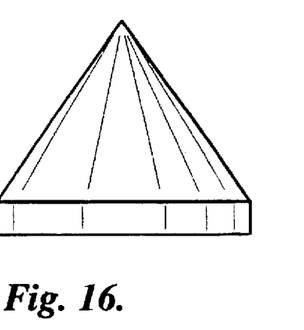
FIG. 16 is a front view of the vehicle body shown in FIG. 14.
Figure 17:
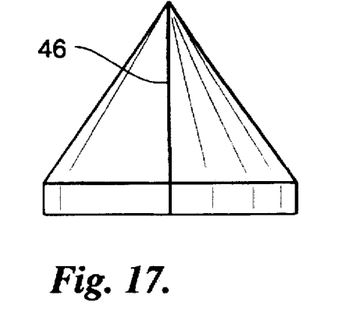
FIG. 17 is a rear view of the vehicle body shown in FIG. 14.

The skin 16 of the vehicle is constructed from flat sheets shown in FIGS. 8, 9, 12, and 13. FIG. 8 shows the forward top sheet 30A, middle top sheet 30B, and rear top sheet 30C with a sufficient overlap to assure good joints. The forward 30A, middle 30B, and rear 30C top sheets are bent over the frame 14 and conformed to it as shown in FIGS. 1 and 5 and attached to the roll bars 22 and upper tube 24 using rivets or other conventional attachment means. If the alternate embodiment of the frame 14 as shown in FIGS. 6 and 7 is used, the skin 16 is attached to the longitudinal members 31 and the upper tube 24. When the top sheets 30 are bent over the frame 14, a ruled surface is formed. A ruled surface is a surface in which every point on the surface has at least one straight line passing through it which extends to two edges of the surface. Another way to define a ruled surface is that every portion of the surface is curved in at most one direction. Thus, a cone, for example, would be a ruled surface. An alternate embodiment of the representation of the skin 16 is shown in FIG. 12. This embodiment of the skin 16 is attached to the frame 14 in the same manner as above and shows a similar amount of overlap between the segments. This embodiment has two side top sheets 30X and two center top sheets 30Y. As shown in FIGS. 9 and 13, the sheets 30 are fabricated from thin flat stock such as thin sheet metals, ⅛" thick transparent Lexan (polycarbonate) sheet, or plywood. No bending or other prefabrication is necessary before attaching the sheets to the vehicle frame 14. Thus, the sheets 30 are bent over the frame 14, conformed thereto, and attached to it without the necessity of plastic deformation. Indeed, all of the skin components of the embodiments shown in FIGS. 1, 5, 10, i.e., the top sheets 30, connecting sheet 28, top rear panel 42, and bottom rear panel 38, are originally made flat. This makes it feasible for the skin components to be readily and inexpensively constructed, and further makes it feasible for small manufacturers without large amounts of capital to manufacture the skin. Further, because the skin 16 of the vehicle body in FIGS. 1, 5, 10, and 11 is made up of the six individual segments, front, middle, and rear top sheets 30, connecting sheet 28, top rear panel 42, and bottom rear panel 38, repair is easy and inexpensive. If one segment of the skin 16 becomes damaged, it is only necessary to replace that one segment instead of the entire vehicle body skin 16. FIG. 12 also illustrates a patch 35 which can be used to repair the skin 16. If the skin 16 is punctured or damaged, the damaged skin may be removed and a patch 35 rivetted, or glued for example to the undamaged skin to cover the hole. This embodiment of the invention provides an advantage over and above the segmentation known in the art, that is, the inexpensive nonprefabricated replacement sheets versus the expensive prefabricated fender, for example.

Figure 10:
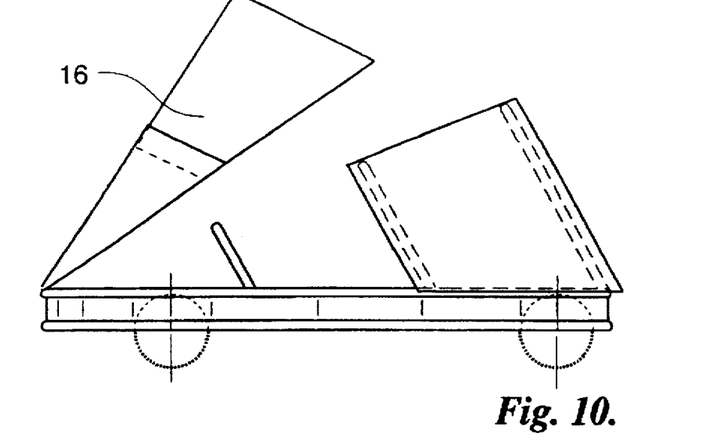
FIG. 10 is a side view of the vehicle body skin being lifted above the vehicle body frame on hinges to allow access to the vehicle body.
Figure 11:
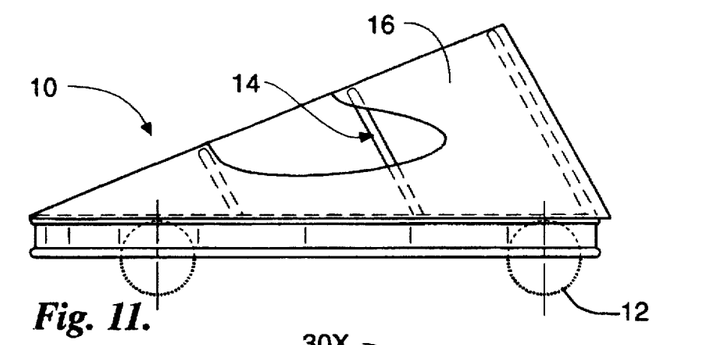
FIG. 11 is a side view of the teardrop shaped vehicle body according to the present invention illustrating an embodiment of the configuration for the transparent portion of the skin.
Figures 20, 21, 22, 23, 24:
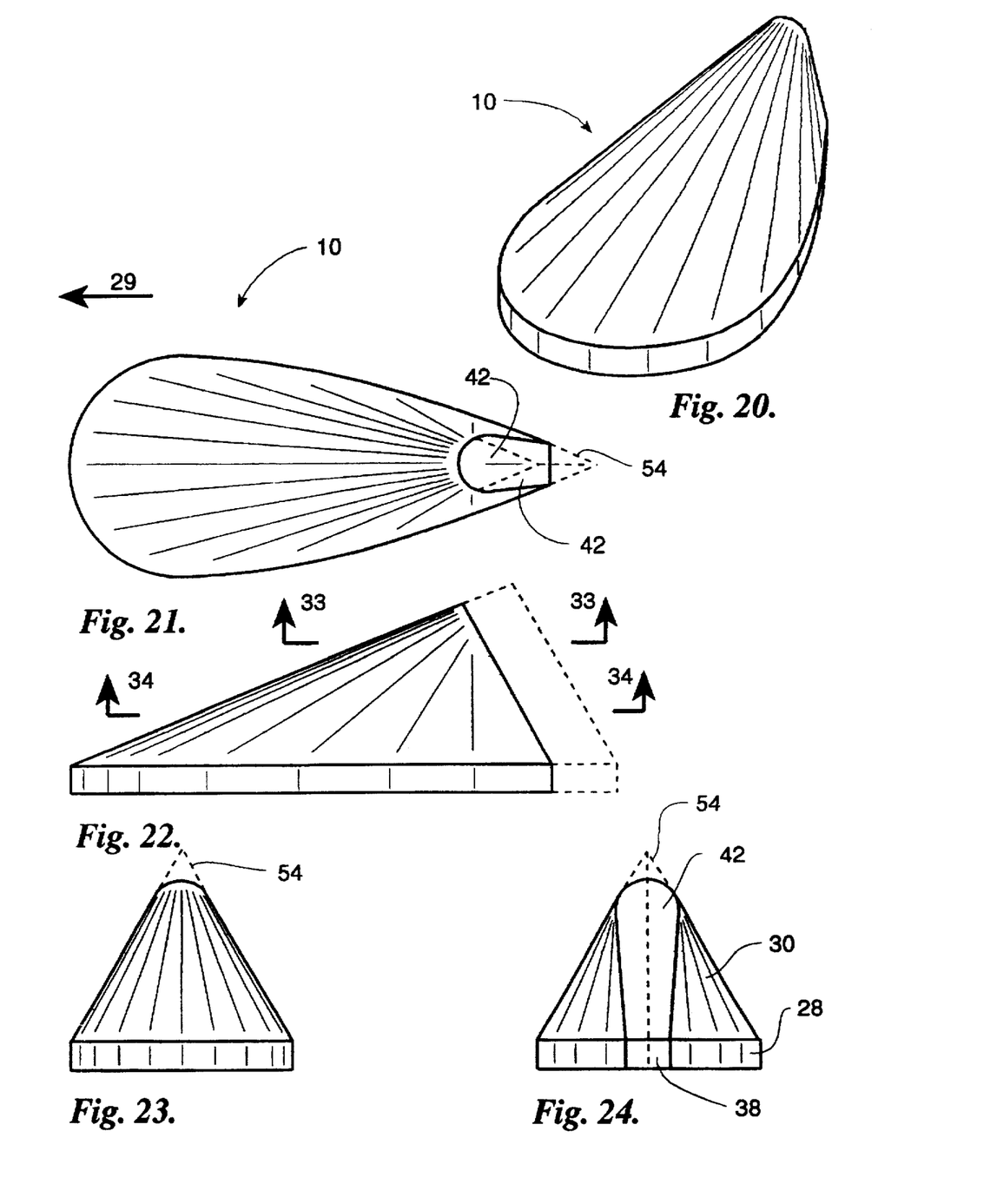
FIG. 20 is a perspective view of a teardrop shaped vehicle body having a flat and narrow rearward portion.
FIG. 21 is a top view of the teardrop shaped vehicle body of FIG. 20.
FIG. 22 is a side view of the vehicle body shown in FIG. 20 illustrating that the vehicle body elevates from front to rear in the opposite direction of forward travel.
FIG. 23 is a front view of the vehicle body shown in FIG. 20.
FIG. 24 is a rear view of the vehicle body shown in FIG. 20.
Figures 25, 26, 27, 28, 29:
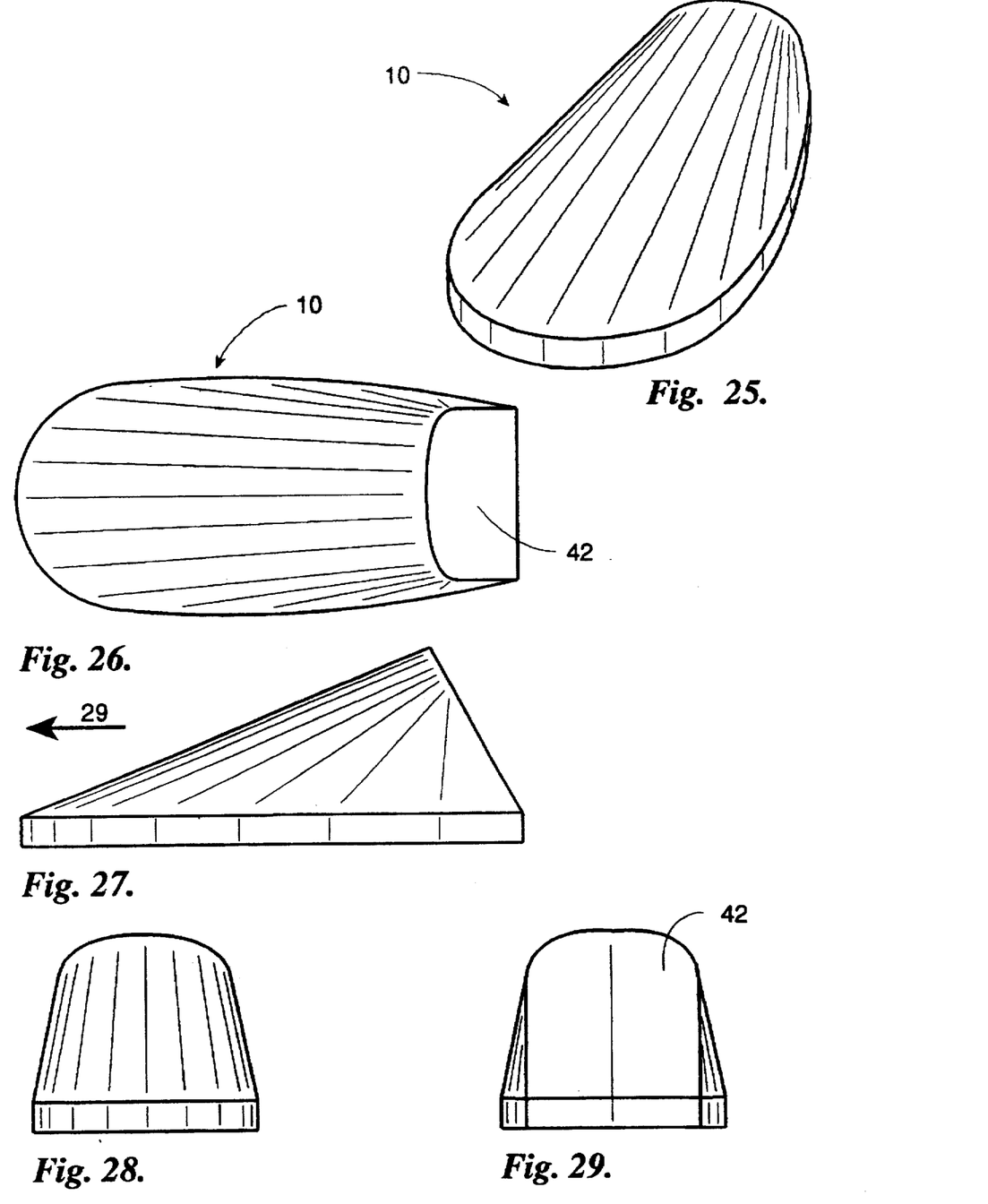
FIG. 25 is a perspective of a teardrop shaped vehicle body having a flat and broad rear end portion.
FIG. 26 is a top view of the vehicle body shown in FIG. 25.
FIG. 27 is a side view of the vehicle body shown in FIG. 25 illustrating that the vehicle body elevates from front to rear in the opposite direction of forward travel.
FIG. 28 is a front view of the vehicle body shown in FIG. 25.
FIG. 29 is a rear view of the vehicle body shown in FIG. 25.
Figure 33:
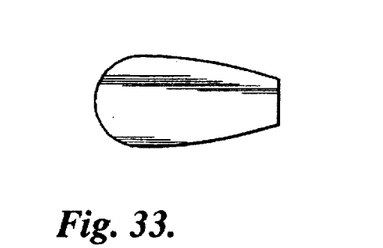
FIG. 33 is a schematic horizontal cross section taken along line 33—33 of FIG. 21.
Figure 34:
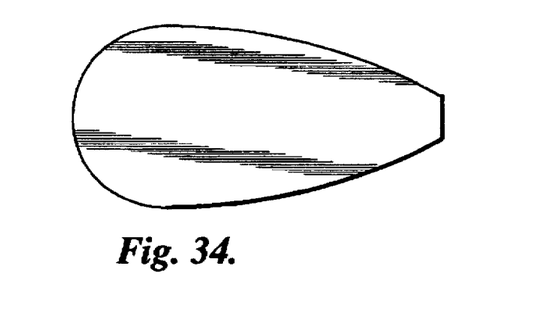
FIG. 34 is a schematic horizontal cross section taken along line 34—34 of FIG. 21.

Once the skin 16 is attached to the frame 14, the skin 16 defines the outer edge of a plurality of horizontal cross sections which are in the shape of teardrops as shown schematically by FIGS. 33 and 34 cut through FIG. 22. FIGS. 33 and 34 are not true cross sections and merely illustrate the shape defined by the skin. Thus, the teardrop shape is transferred from the bottom skirt 20 to the remainder of the vehicle body 10. The horizontal cross sections may exist throughout the entire height of the vehicle body or only a portion of that height. However, the embodiments do not provide a teardrop shaped side elevation. In a preferred embodiment of the invention, the middle top sheet 30B is removably attached to the frame 14 so that it may be lifted as shown in FIGS. 1 and 5 to allow entry inside of the vehicle body 10. As shown in FIG. 10, the skin 16 may also be attached to the frame 14 with hinges allowing the skin 16 to be lifted above the frame 14 thereby allowing a driver or passenger to enter the vehicle body 10. The driver is allowed to view the surroundings through the transparent aperture shown in FIG. 11. If the middle top sheet 30B and rear top sheet 30C are constructed from the transparent Lexan sheet, the driver will have circumferential visibility of the surroundings.

Figure 18:
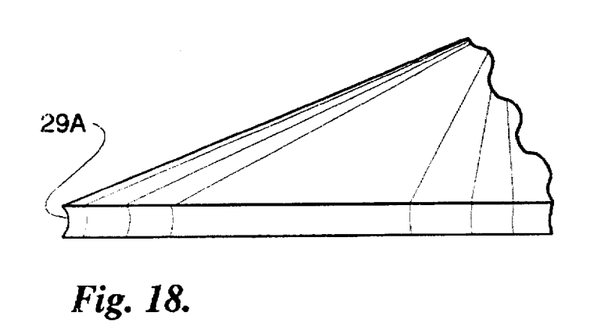
FIG. 18 is a side view of an alternate embodiment of the configuration for the rear of the vehicle body having a wavy rearward portion.
Figure 19:
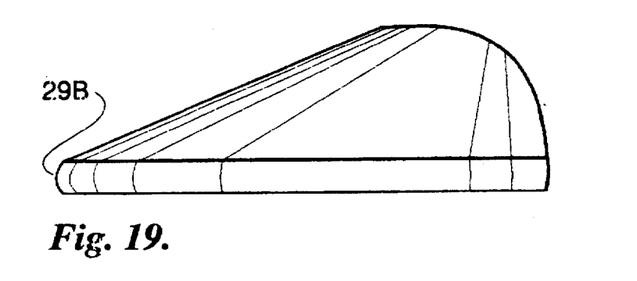
FIG. 19 is a side view of an alternate embodiment of the configuration for the rear of the vehicle body having a rounded rearward portion.
Figures 30, 31, 32:
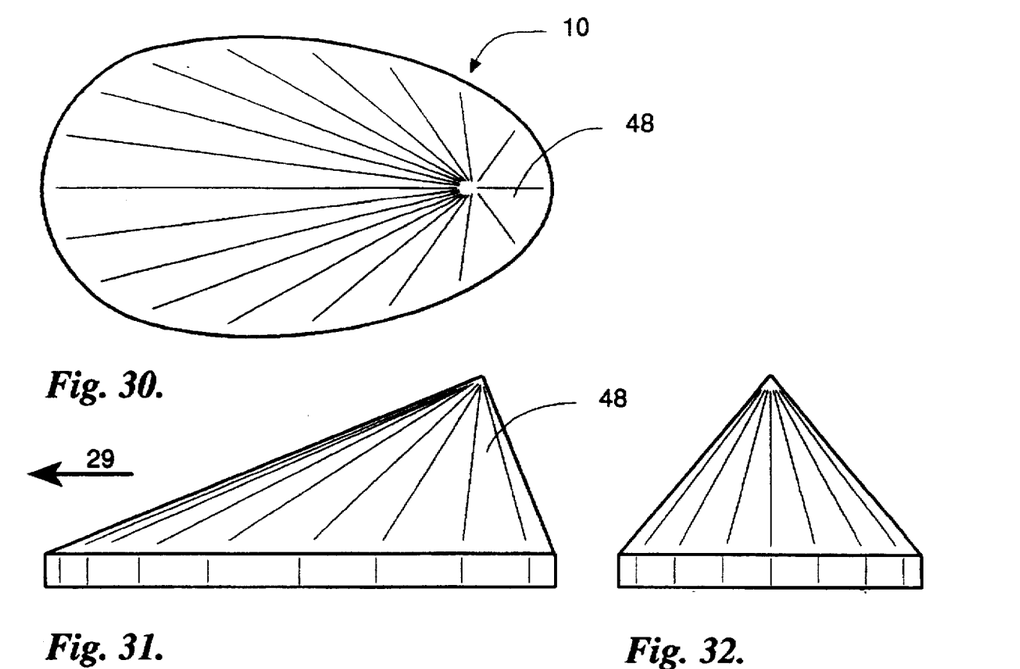
FIG. 30 is the top view of a teardrop shaped vehicle body having a curved rearward portion.
FIG. 31 is the side view of the vehicle body shown in FIG. 30 illustrating that the vehicle body elevates from front to rear in the opposite direction of forward travel.
FIG. 32 is a front view of the vehicle body shown in FIG. 30.

FIGS. 14, 15, 16, and 17 show the pure teardrop shape embodiment of the vehicle body design having an edge 46 for its rearward portion. This teardrop shape has a circular front and gradually curving sides narrowing rearwardly to the edge 46. Many vehicle body designs are derived by truncating the rear of the vehicle body. By truncating the vehicle body at dashed line 52, the vehicle body design having a flat and narrow rearward portion 43 is created as shown in FIGS. 20, 21, 22, 23, and 24. The dashed lines 54 show the now truncated portion of the vehicle body. FIG. 18 shows a wavy rearward portion obtained by truncating the pure teardrop shape, and FIG. 19 shows a rounded rearward portion also obtained by truncating the pure teardrop shape. These figures are included to illustrate that many rearward portion configurations can be obtained by the truncation of the rear of the vehicle body. FIGS. 25, 26, 27, 28, and 29 show an alternate teardrop shaped configuration having a rearward portion which is flat and broad 44. This particular shape, because of its broadness, would likely have four wheels instead of three and can be used to accommodate more passengers in the vehicle body 10. FIGS. 30, 31, and 32 show an alternate embodiment of the vehicle body design which has a curved rearward portion 48.

All of these preferred embodiments utilize a vehicle body 10 increasing in height from front to rear. Thus, when the vehicle body 10 is traveling in the forward direction 29, the vehicle body 10 is pushed down onto the street (if, for example, the vehicle body is used on an automobile) by the wind resistance adding stability to the vehicle body during forward travel 29.

Thus, a safe and aerodynamic vehicle body and its method of construction are disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A vehicle body comprising a frame and a skin attached thereto, said skin including at least one bent elastic sheet, wherein substantially the entirety of said skin forms a single substantially ruled surface.

2. A vehicle body comprising a frame and a skin attached thereto, said skin including at least one bent elastic sheet, wherein substantially the entirety of said skin forms a single substantially ruled surface over said frame, said body further comprising a means for entry into a space defined by said skin, wherein said means for entry comprises said skin being hingedly or releasably attached to said frame, and said skin can be lifted from said frame to allow entry.

3. A vehicle body comprising:
   (a) a frame;
   (b) a skin attached to said frame, said skin including at least one elastic sheet conformed to said frame such that the entirety of said skin forms a continuously and substantially ruled surface over said frame.

* * * * *